Sept. 12, 1950  R. O. THOMPSON  2,522,145
EXPANSION SAFETY VALVE
Filed Feb. 9, 1945

INVENTOR.
ROBERT O. THOMPSON
BY *Victor J. Evans & Co.*
ATTORNEYS

Patented Sept. 12, 1950

2,522,145

UNITED STATES PATENT OFFICE 2,522,145

EXPANSION SAFETY VALVE

Robert O. Thompson, Philadelphia, Pa.

Application February 9, 1945, Serial No. 577,009

1 Claim. (Cl. 137—53)

The invention relates to a valve, and more especially to an expansion safety valve.

The primary object of the invention is the provision of a valve of this character, wherein the valve head is acted upon by a spring, which is confined within a protective sleeve, and encircles the stem of such head, the stem being slidable through an adjusting screw supported in a hanger yoke engaged about a seat for the head, and in this manner a positive seating of the valve is assured, the valve being usable for any purpose desired, and is maintained closed under tension.

Another object of the invention is the provision of a valve of this character, wherein the construction thereof is novel and unique, its parts being readily accessible, and such valve is assured of positive seating, and fulcrum suspended.

A further object of the invention is the provision of a valve of this character, which is simple in construction, thoroughly reliable and efficient in operation, strong, durable, readily and easily adjusted, compact in the assembly thereof, and inexpensive to manufacture and install.

With these and other objects in view the invention consists in the features of construction, combination and arrangement of parts as will be hereinafter more fully described in detail, illustrated in the accompanying drawing, which shows the preferred embodiment of the invention, and pointed out in the claim hereunto appended.

In the accompanying drawing.

Similar reference characters indicate corresponding parts throughout the several views in the drawing.

Figure 1:
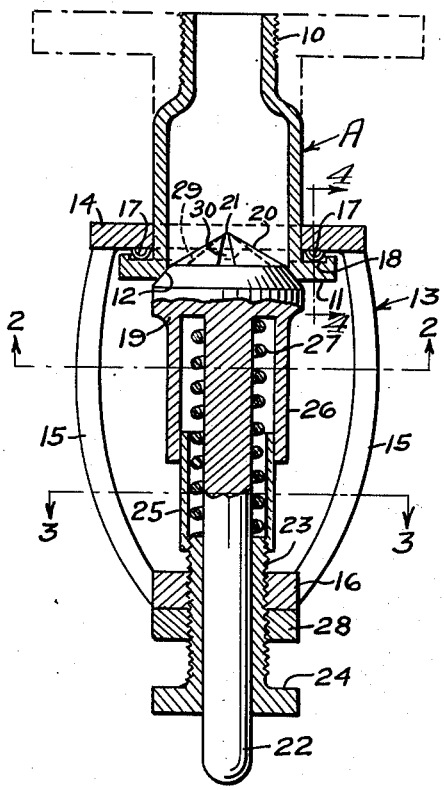
Figure 1 is a vertical transverse sectional view through a valve constructed in accordance with the invention.
Figure 2:
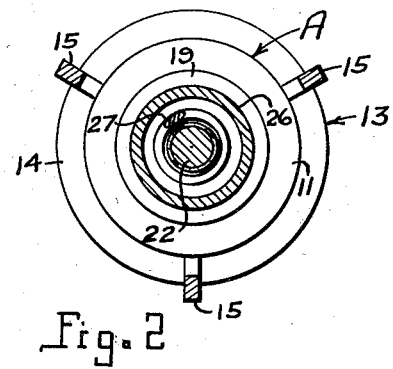
Figure 2 is a sectional view taken on the line 2—2 of Figure 1 looking in the direction of the arrows.
Figure 3:
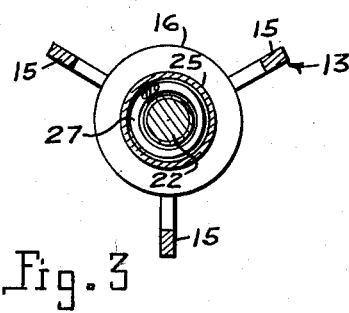
Figure 3 is a sectional view taken on the line 3—3 of Figure 1 looking in the direction of the arrows.
Figure 4:
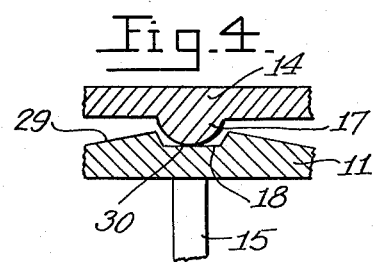
Figure 4 is an enlarged detailed sectional view on the line 4—4 of Figure 1 showing the fulcrum elements and the manner in which they are mounted in the annular channel on the nipple for supporting the cage thereon.

Referring to the drawing in detail, A designates a nipple, having a reduced externally thread end 10 tapped into a suitable port forming a fluid outlet, not shown, while the other end of such nipple is provided with an outturned annular rim 11 forming a ledge externally thereon. This end having the rim 11 is provided with a beveled circular valve seat 12.

Suspended from the rim 11 is cage 13 having a ring-like end portion 14, from which extend outwardly curved or bowed arms 15, these merging with a ring-like end portion 16, which is of less diameter than the portion 14, both portions 14 and 16 being integral with the said arms 15. The portion 14 is formed with fulcrum contacts 17, which are engaged in a circular rest channel 18 provided in the upper side of the annular rim 11.

Engageable with the seat 12 is a valve head 19, which has ice breaking ribs 20, these sloping from a common center 21 on the seating side of the head. The head 19 has a stem 22, which slidably fits within the central bore in the externally threaded shank 23 of an adjusting screw 24, which shank is threaded in the end portion 16 of the cage 13.

The shank 23 is formed with a cup shaped sheathing 25, which telescopically interfits a companion sheathing 26 formed on the head 19 and concentric to the stem 22, for protecting a coiled expansion spring 27 about the stem 22, the sheathings completely housing the said spring. This spring plays against the head 19 and also against the screw 24, and functions to maintain the head seated and in closing contact with the seat 12. The screw 24 enables the adjustment of the tension of the spring 27, as should be clearly seen in Figure 1 of the drawing.

The valve in its entirety as constructed in accordance with the invention acts as an expansion safety valve wherever its use may be required.

The screw 24 is locked in an adjusted position in the portion 16 by a jam nut 28 workable against the latter and carried on the threaded shank 23 of such screw.

The channel 18 is undulated as at 29, to effect a rest notch 30 for each contact 17, which preferably are four in number, and thus the cage will not rotate on the portion 14 when in fulcrum engagement therewith, and also the head will seat itself through suspension by the said cage.

What is claimed is:

A valve of the kind described, comprising a closure head having a stem, a suspended cage, means for suspending the cage, an annular rim on said means, said cage comprising an upper ringlike portion mounted on said means above said rim and a lower ringlike portion and bowed arms connecting said ringlike portions, an adjusting screw supported by said cage and having the stem slidable therethrough, expansible means between said head and adjustable screw and acted upon by the screw for urging the head to seat closing positions, means on the screw and engaging the cage to lock the said screw in adjusted position, enclosing means on the screw and stem for housing the expansion means, a circular rest channel in the upper side of said rim, and fulcrum supports for the cage formed on the under face of the upper ring-like portion and engaging in the channel in the rim for respectively sustaining the head in confronting relation to the seat therefor.

ROBERT O. THOMPSON.

REFERENCES CITED

The following references are of record in the file of this patent:

UNITED STATES PATENTS

| Number | Name | Date |
|---|---|---|
| 121,659 | Prescott | Dec. 5, 1871 |
| 1,129,763 | Torjovsky | Feb. 23, 1915 |
| 2,117,473 | Glab | May 17, 1938 |
| 2,124,374 | Mulloy | July 19, 1938 |

FOREIGN PATENTS

| Number | Country | Date |
|---|---|---|
| 4,270 | Great Britain | Feb. 17, 1897 |